(12) United States Patent
Sasse

(10) Patent No.: US 6,827,187 B2
(45) Date of Patent: Dec. 7, 2004

(54) HYDRODYNAMIC COUPLING DEVICE

(75) Inventor: Christoph Sasse, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/380,340

(22) PCT Filed: Jul. 28, 2001

(86) PCT No.: PCT/EP01/08777

§ 371 (c)(1),
(2), (4) Date: Mar. 12, 2003

(87) PCT Pub. No.: WO02/31382

PCT Pub. Date: Apr. 18, 2002

(65) Prior Publication Data

US 2004/0094380 A1 May 20, 2004

(30) Foreign Application Priority Data

Oct. 13, 2000 (DE) .......................... 100 50 729

(51) Int. Cl.⁷ ............................................ F16H 45/02
(52) U.S. Cl. ...................................... 192/3.29; 192/212
(58) Field of Search ............................. 192/3.28, 3.29, 192/57, 107 R, 200, 212

(56) References Cited

U.S. PATENT DOCUMENTS

| | | | | |
|---|---|---|---|---|
| 4,353,444 A | * | 10/1982 | Bionaz ....................... | 192/3.29 |
| 4,926,988 A | * | 5/1990 | Kundermann ............... | 192/3.3 |
| 5,441,135 A | | 8/1995 | Worner et al. .............. | 192/3.29 |
| 5,533,602 A | | 7/1996 | Worner et al. .............. | 192/3.29 |
| 5,957,258 A | * | 9/1999 | Schulz-Andres et al. | 192/70.17 |
| 6,026,941 A | * | 2/2000 | Maienschein et al. ..... | 192/3.29 |
| 6,155,392 A | * | 12/2000 | Kundermann ................ | 192/57 |
| 6,223,872 B1 | * | 5/2001 | Heller et al. ............... | 192/3.29 |
| 6,293,380 B1 | * | 9/2001 | Arhab ........................ | 192/3.29 |

FOREIGN PATENT DOCUMENTS

| | | | |
|---|---|---|---|
| DE | 198 34 062 | 1/2000 | ........... F16H/45/02 |
| WO | WO 00/03158 | 1/2000 | ........... F16H/45/02 |

* cited by examiner

*Primary Examiner*—Rodney H. Bonck
(74) *Attorney, Agent, or Firm*—Cohen, Pontani, Lieberman & Pavane

(57) ABSTRACT

A hydrodynamic coupling device, in particular a torque converter or fluid clutch, comprises a housing assembly, a turbine wheel provided inside the housing assembly, and a torque converter lockup clutch assembly for establishing a torque transmission connection as desired between the turbine wheel and the housing assembly. The torque converter lockup clutch assembly comprises at least one essentially annular friction element, which is connected to the turbine wheel for mutually rotating about a rotational axis, and a pressing element which is connected to the housing assembly for mutually rotating about the rotational axis. The at least one friction element can be subjected to the action of the pressing element in order to establish the torque transmission connection between the turbine wheel and the housing assembly. The ratio of a flow outside diameter in the area of the turbine wheel to a friction outside diameter of the at least one friction element ranges from 1.30 to 1.80, preferably from 1.35 to 1.70, and/or the ratio of a friction outside diameter of the at least one friction element to a friction inside diameter of the at least one friction element ranges from 1.10 to 1.25, preferably from 1.15 to 1.20.

13 Claims, 2 Drawing Sheets

HYDRODYNAMIC COUPLING DEVICE

PRIORITY CLAIM

This is a U.S. national stage of application No. PCT/EP01/08777, filed on 28 July 2001. Priority is claimed on that application and on the following application: Country: Germany, Application No.: 100 50 729.8, Filed: 13 Oct. 2000.

BACKGROUND OF THE INVENTION

1. Field of the Invention

The present invention is directed to a hydrodynamic clutch device, particularly a torque converter or fluid clutch, comprising a housing arrangement, a turbine wheel provided in the housing arrangement, a lockup clutch arrangement by means of which a torque transmission connection can be produced selectively between the turbine wheel and the housing arrangement, the lockup clutch arrangement comprising at least one substantially annular friction element which is connected to the turbine wheel for rotating jointly about an axis of rotation and a pressing element which is connected to the housing arrangement for rotating jointly about the axis of rotation and by means of which the at least one friction element can be acted upon to produce the torque transmission connection between turbine wheel and housing arrangement.

2. Description of the Related Art

In hydrodynamic clutch devices of the type mentioned above, particularly in a state in which at least some of the torque to be transmitted along an output powertrain is conducted from the housing arrangement to the turbine wheel via the lockup clutch arrangement, torsional vibrations occurring in the drive system can be contained in that a certain slip is permitted in the lockup clutch arrangement, so that torque peaks can lead to a relative rotation between the housing arrangement and the turbine wheel. This results in a comparatively large load on the structural component parts or surface regions coming into frictional contact with one another in the area of the lockup clutch arrangement, since the power losses which occur at least with greater torque fluctuations and which are contained by the slip are converted into heat.

In order to meet the demands of increasing possible power losses in the area of the lockup clutch arrangement, systems are known like those, for example, disclosed in WO 00/03158. In the hydrodynamic torque converter known from this reference, the lockup clutch arrangement has two friction elements coupled with the turbine wheel such that they rotate jointly, an intermediate friction element which is coupled with the housing arrangement for joint rotation being positioned therebetween. The individual friction surface regions are made to interact with each other by the clutch pistons acting as pressing element. By providing a plurality of radially offset friction surface pairs which can be made to interact with one another, the entire available friction surface can be appreciably enlarged without a substantial space requirement with the result that the power loss occurring in slip operation is also distributed over a larger surface and can accordingly be carried off in an improved, faster manner.

SUMMARY OF THE INVENTION

It is the object of the present invention to further develop a hydrodynamic clutch device of the type mentioned in the beginning in such a way that it has improved performance with respect to the demands arising during operation, particularly the demands occurring in slip operation.

According to the invention, a ratio of a flow outer diameter in the area of the turbine wheel to a friction outer diameter of the at least one friction element ranges between 1.30 and 1.80, preferably between 1.35 and 1.70, and/or a ratio of a friction outer diameter of the at least one friction element to a friction inner diameter of the at least one friction element ranges between 1.10 and 1.25, preferably between 1.15 and 1.20.

By means of the first step according to the invention, namely, preparing a determined ratio between the flow outer diameter and the friction outer diameter of the at least one friction element, an appreciably more favorable distribution of mass is obtained, which results in a lower mass moment of inertia. The second step according to the invention leads to a lockup clutch arrangement with larger friction surface regions, so that the occurring power losses can be better absorbed and transmitted to surrounding components or component groups.

It is preferably provided in the hydrodynamic clutch device according to the invention that, in an area radially outside of the lockup clutch arrangement, the housing arrangement has a shape that is adapted to the outer circumferential contour of the lockup clutch arrangement and to the outer circumferential contour of the turbine wheel. As a result of this step, the housing arrangement has greater rigidity particularly in its area which is also provided for the lockup clutch arrangement and for the action of the latter. This causes an appreciably smaller bulging or inflation of the converter housing under the fluid pressure prevailing in the interior of the converter housing, so that even relatively wide friction surface regions—measured in radial direction—can not lead to edge loading of friction linings or the like induced by bulging. For example, it can be provided for this purpose that the housing arrangement is constructed in a first housing portion so as to surround the lockup clutch arrangement substantially cylindrically and has, in a second housing portion adjoining the first housing portion, a shape which is curved in direction of the axis of rotation and extends along the outer circumferential area of the turbine wheel.

According to another advantageous aspect of the present invention, it can be provided that the at least one friction element is connected to the turbine wheel so as to be essentially rigid against rotation by a driving element. Therefore, it is no longer necessary to couple the at least one friction element to the turbine wheel via a torsional vibration damper or the like with the result that the installation space can be used more efficiently and, in particular, the shape of the housing arrangement mentioned above can be provided in a simple manner.

The efficient use of construction space can be further assisted in the hydrodynamic clutch device according to the invention in that the pressing element is connected to the housing arrangement so as to rotate jointly by a driving arrangement which is arranged essentially in the axial area between the pressing element and the turbine wheel.

As was already stated, it is advantageous for increasing the effective friction surface region when a plurality of friction elements are provided, wherein an intermediate friction element connected to the housing arrangement for joint rotation is arranged between two friction elements in each instance.

In order to further optimize the mass moment of inertia existing in the hydrodynamic clutch device according to the invention, a substantially annular first coupling element can be provided which is connected in its radial inner area to an outer side of the housing arrangement, preferably by laser welding, and is constructed in its radial outer area for coupling with a second coupling element which is fixedly connected or connectable to a drive shaft.

A construction of a hydrodynamic clutch device which is particularly simple to realize and which operates on the principle of a dual-line system can be achieved in that an interior space of the housing arrangement is divided by a pressing element into a first space in which the turbine wheel is arranged and a second space, and in that work fluid can be introduced into the first space and work fluid can be conducted out of the second space, or vice versa, for an exchange of work fluid that is provided in the interior. In order to enable an exchange of fluid in a system of the type mentioned above also during the locked up state, it is proposed that at least one fluid through-opening is provided in the pressing element to enable an exchange of fluid between the first space and the second space. Further, to enable a fluid cooling in the slip state, it is further suggested that a flow channel arrangement which is preferably arc-shaped is provided in a friction surface region of the at least one friction element. This flow channel arrangement is then preferably open toward the two spaces, so that a passage of fluid through the flow channel arrangement will take place due to the pressure difference between the two spaces which exists in any case in the locked up state, and the heat energy occurring in this spatial region can be carried off.

DETAILED DESCRIPTION OF THE PRESENTLY PREFERRED EMBODIMENTS

Figure 1:
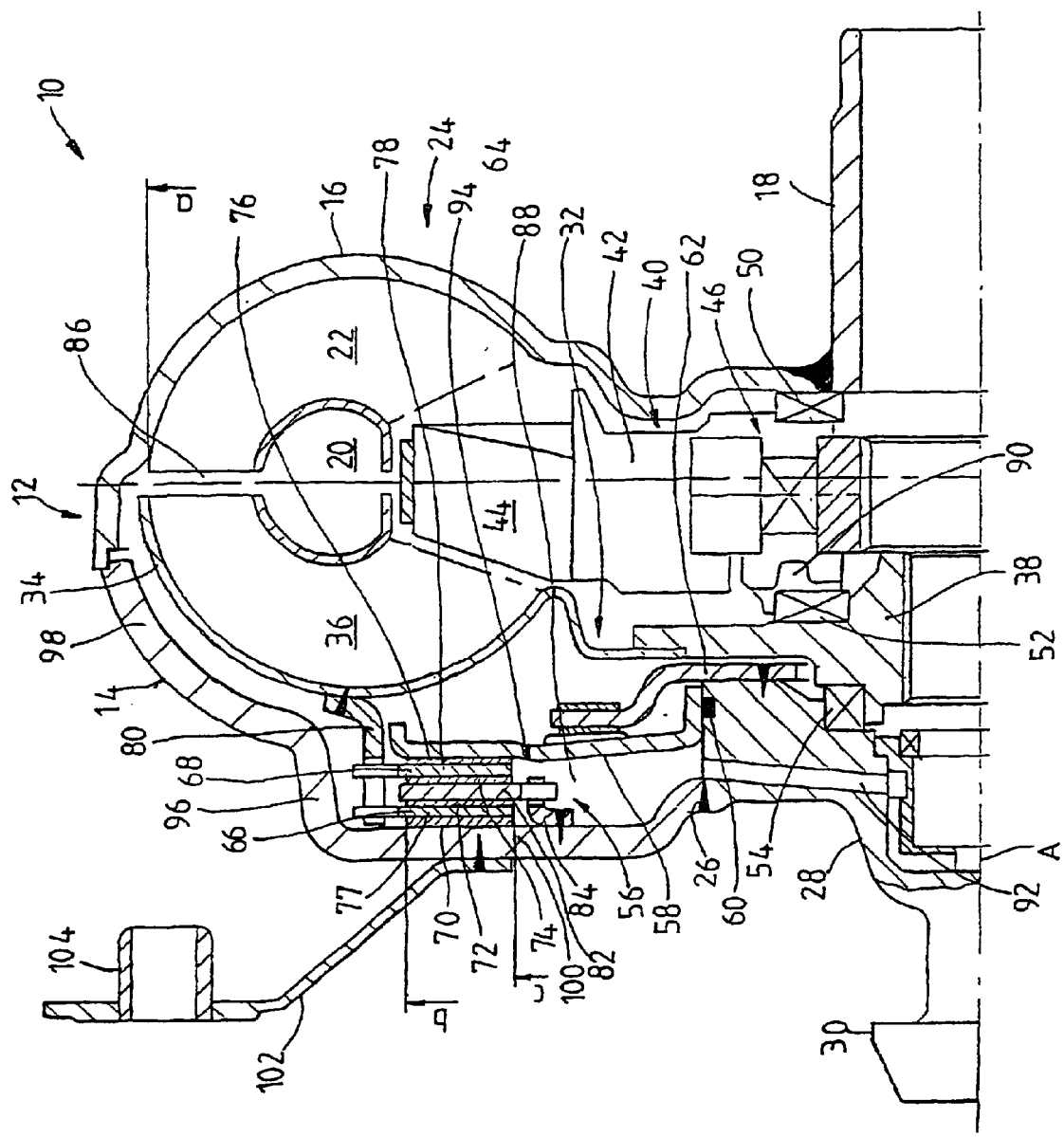
FIG. 1 shows a partial longitudinal section through a hydrodynamic clutch device according to the invention.

The hydrodynamic torque converter 10 shown in FIG. 1 comprises a housing arrangement which is designated in general by 12. This housing arrangement 12 in turn substantially comprises a housing cover 14 which is fixedly connected in its radial outer area, for example, by welding, to an impeller wheel shell 16. The impeller wheel shell 16 is fixedly connected on the radial inside to an impeller wheel hub 18. At its inner side facing the interior space 20, the impeller wheel shell 16 carries a plurality of impeller wheel blades 22 arranged successively in circumferential direction. Together with the impeller wheel hub 18 and the impeller wheel blades 22, the impeller wheel shell 16 substantially forms an impeller wheel 24. In its radial inner area, the housing cover 14 has a central opening 26 in which a housing hub 28 is inserted. In its area located near the axis of rotation A, the housing hub 28 carries a centering pin 30 which is inserted into a corresponding centering recess of a drive shaft, not shown, e.g., a crankshaft, for aligning the axis of rotation A of the torque converter 10 with respect to the axis of rotation of the drive shaft. Further, a turbine wheel which is designated generally by 32 is arranged in the interior 20 of the torque converter 10. This turbine wheel 32 comprises, in the radial outer area, a turbine wheel shell 34 which carries a plurality of turbine wheel blades 36 at its side facing the impeller wheel 24. On the radial inside, the turbine wheel shell 34 is fixedly connected to a turbine wheel hub 38, for example, by welding. The turbine wheel hub 38 in turn can be connected to a driven shaft, for example, a transmission input shaft, so as to be fixed with respect to rotation relative to it.

A stator wheel 40 is provided axially between the impeller wheel 24 and the turbine wheel 32. The stator wheel 40 comprises a plurality of stator wheel blades 44 on a stator wheel ring 42, these stator wheel blades 44 being positioned between the radial inner end regions of the impeller wheel blades 22 and the turbine wheel blades 36. The stator wheel ring 42 is supported via a freewheel arrangement, designated generally by 46, on a supporting element, for example, a supporting hollow shaft, not shown, so as to be rotatable in one direction around the axis of rotation A and blocked against rotation in the other direction. In axial direction, the stator wheel 40 is supported axially by two bearing arrangements 50, 52 with respect to the impeller wheel 24 on one side and with respect to the turbine wheel 32 on the other side. The turbine wheel 32 is supported in turn axially at the housing hub 28 by a bearing 54.

A lockup clutch arrangement, designated generally by 56, is provided to produce a direct mechanical torque transmission connection between the turbine wheel 32 and the housing arrangement 12. This lockup clutch arrangement 56 comprises a clutch piston 58 which is held so as to be axially displaceable by a radial inner cylindrical portion on an outer circumferential surface of the housing hub 28 with the intermediary of a sealing element 60. A ring-shaped or star-shaped driving element 62 is fastened, for example, by laser welding, to an end face of the housing hub 28 facing the turbine wheel 32. This driving element 62 has, in its radial outer area, an elastic arrangement, for example, one or more leaf spring elements 64 by which the piston 58 is held so as to be axially movable with respect to the driving element 62 but not rotatable in circumferential direction around the axis of rotation A.

The lockup clutch arrangement 56 further comprises two plate elements or friction elements 66, 68 which carry friction linings 70, 72, 74, 76 at their respective axial end faces. In their radial outer area, respective carrier elements 77, 78 of the friction elements 66, 68 have teeth in driving engagement with corresponding teeth of an annular driving element 80. This driving element 80 is fastened to a surface region of the turbine wheel shell 34 again by laser welding, for example. Accordingly, a connection which is rigid with respect to rotation is produced between the friction elements 66, 68 and the turbine wheel 32.

Located axially between the two friction elements 66, 68 is an intermediate friction element 82 having teeth in its radial inner area, which teeth engage corresponding teeth of a driving element 84 fastened to the housing cover 14.

In order to produce the locked up state, the fluid pressure in a space 86 in the housing arrangement 12, in which space 86 the turbine wheel 32 is also arranged, is increased with respect to the fluid pressure prevailing in a space 88. This space 88 lies essentially between the piston 58 and the housing cover 14, i.e., the interior 20 of the housing arrangement 12 is essentially divided into these two spaces 86 and 88 by the piston 58. In order to increase the fluid pressure in the space 86, fluid can be introduced via a through-opening arrangement 90 in the area of the stator wheel 40 by the fluid pump, not shown, via an intermediate space formed, for example, between the driven shaft, not shown, and the supporting hollow shaft. When not in the locked up state, the fluid can enter the space 88 from space 86 by flowing around the friction elements 66, 68 and can flow to a central through-opening in the driven shaft via through-openings 92 which are provided in the housing hub 28 and extend radially inward and then to a fluid reservoir. In order to make possible an exchange of fluid also in the locked up state in which the clutch piston 58 is pressed against the friction element 68 and, basically in the radial outer area, the space 88 is sealed with respect to space 86 so as to be tight against fluid by means of the surface regions in frictional contact with one another, at least one through-opening 94 is provided in the clutch piston 58, which through-opening 94 is located radially inside of an annular surface region thereof which frictionally cooperates with the friction lining 76 of the friction element 68. Further, the friction linings 70, 72, 74, 76 have lining grooves, for example, with a curved contour, which open toward the space 86 in the radial outer area and open toward space 88 in the radial inner area, so that the occurring friction heat can be guided off also in the locked up state, particularly in the slip state, by fluid flowing through in the region of the friction linings 70, 72, 74, 76.

As was already stated, it is advantageous, for example, in order to achieve a torsional vibration damping, to operate the lockup clutch arrangement 56 in a slip state so that a relative rotation between the housing arrangement 12 and the turbine wheel 32 is possible at least when torque peaks occur. By providing a plurality of friction surface pairs which engage with one another frictionally, the entire available friction surface is increased, with the result that the occurring load is distributed over a larger surface region and, therefore, the dissipation of heat can also be improved. In order to optimize or minimize the total mass moment of inertia, the friction outer diameter b of the friction linings 70, 72, 74, 76 is kept comparatively small. Accordingly, a ratio of the fluid flow outer diameter a which approximately corresponds to the outer diameter of the turbine wheel 32 with respect to the friction outer diameter b is preferably in the range of 1.35 to 1.70. This means that the flow outer diameter a is appreciably greater than the friction outer diameter b.

Further, the value of the ratio between the friction outer diameter b and the friction inner diameter c of the friction linings 70, 72, 74, 76 is advantageously in the range of 1.15 to 1.20. This results in a comparatively large radial extension of the annular friction linings. Further, in order for this to be realized without difficulty in operation, the housing 12 of the hydrodynamic torque converter 10 is constructed in such a way that directly adjoining the radial outer area of the lockup clutch arrangement 56, i.e., the radial outer area of the friction elements 66, 68, in a first housing portion 96, the housing cover 14 extends approximately cylindrically or axially and therefore runs close to the outer circumferential contour of the lockup clutch arrangement 56, which means that a stiffening of the housing arrangement 12 is provided directly adjoining the lockup clutch arrangement 56 in the radial outer area by means of the bent contour of the housing cover 14. In the area near the turbine wheel 32 and turbine wheel shell 34, the housing cover 14 is curved in an arc shape in axial direction in a second housing portion 98 which adjoins the first housing portion 96 or passes into the latter and its shape is therefore adapted to the outer contour of the turbine wheel 32. This leads to a further stiffening of the housing arrangement 12 with the result that a bulging or inflation of the housing 12 which leads to edge loading in the area of the friction lining 70 in which the latter contacts a substantially radially extending portion 100 of the housing arrangement 12 can be prevented due to the work fluid which is provided under pressure in the interior 20.

This structure of the torque converter 10 according to the invention is made possible essentially in that the friction elements 66, 68 are connected to the turbine wheel shell 34 without providing a torsional vibration damper in its radial outer area.

Of course, more than two friction elements 66, 68, for example, three friction elements, and, in this case, a correspondingly larger quantity of intermediate friction elements 82 can be used in the torque converter 10 according to the invention. Also, the basic concept can be used with only one friction element. By combining the total friction surface—which is increased nevertheless—with a torque converter principle of the dual-line system in which the work fluid is introduced into the space 86 and guided out again via the space 88, a very functional high-power converter is obtained in which torque fluctuations can be contained in particular through the slip operation of the lockup clutch arrangement 56.

Another advantage of the torque converter 10 according to the invention consists in the way that the torque converter 10 is connected to a drive shaft. FIG. 1 shows an annular coupling element 102 which is bent in axial direction and formed of sheet metal, for example. In its radial inner area, this coupling element 102 is preferably arranged at the housing cover 14 by laser welding. Laser welding is advantageous in this case because it is carried out in the area in which the housing cover 14 provides a friction surface at its inner surface and therefore any deformation would be disadvantageous when carrying out a welding process. In its radial outer area, the coupling element has a plurality of nut elements 104 or the like. Screw bolts, or the like, connecting the coupling element 102 with a flexplate or the like can be screwed into these nut elements 104. This flex plate can then be screwed to a crankshaft flange or the like by its radial inner area in a manner known per se. This economizes on weight in the radial outer area of the torque converter 10 and accordingly further reduces the mass moment of inertia.

Figure 2:
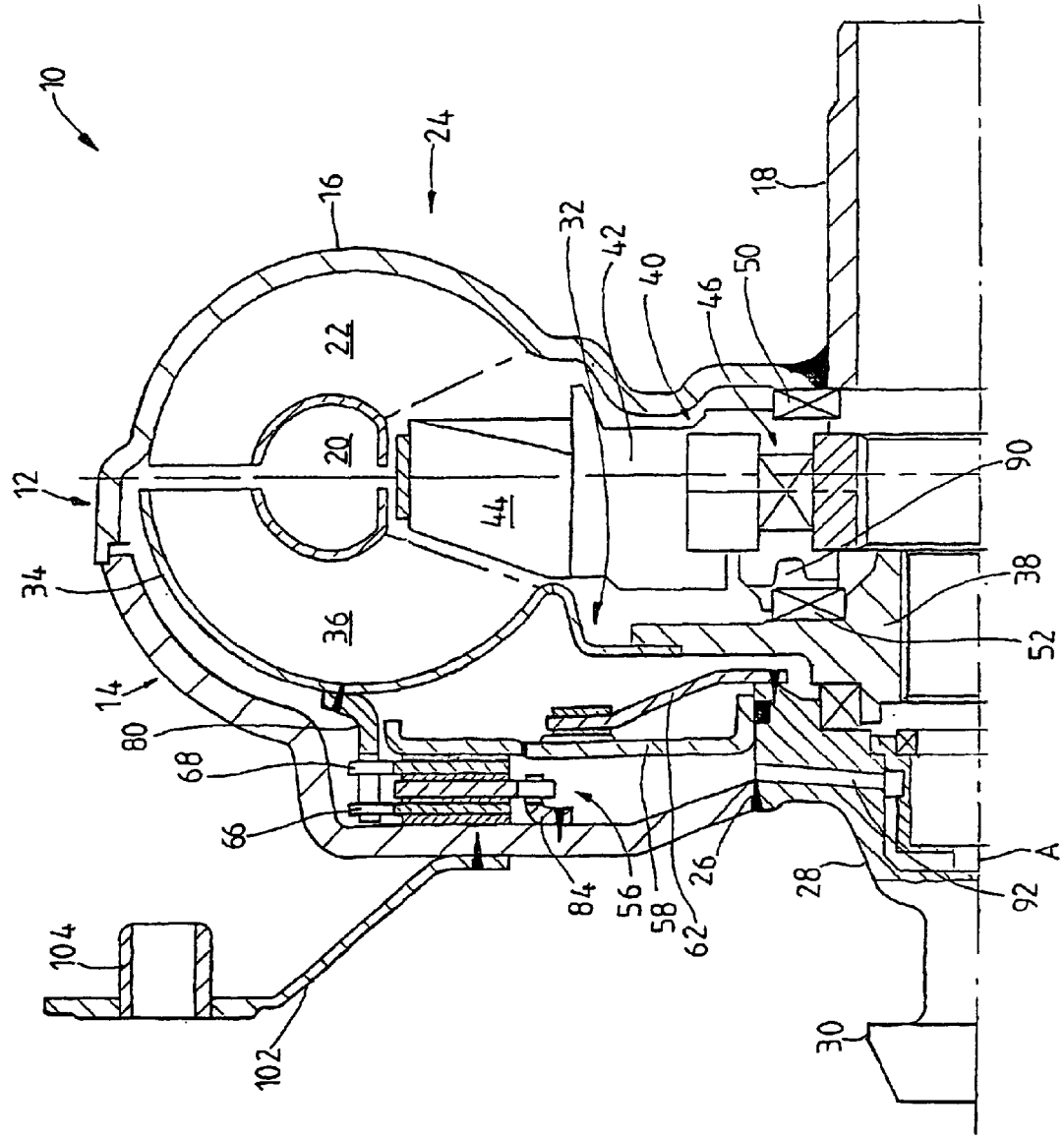
FIG. 2 shows a modified embodiment form of the hydrodynamic clutch device shown in FIG. 1.

A construction such as that shown in FIG. 2 can contribute to a further reduction in the mass moment of inertia. In principle, this construction essentially corresponds to the embodiment form according to FIG. 1. However, it will be seen that the radial extension of the housing hub 28 is appreciably reduced. Since the housing hub 28 is constructed as a solid metal part, this represents a considerable saving of weight and a corresponding reduction in the mass moment of inertia. It will be seen in the embodiment form according to FIG. 1 that approximately half of the radial extension between the friction outer diameter and the axis of rotation A is occupied by the housing hub 28, while in the embodiment form according to FIG. 2 this value is in the range of one third. In other respects, the embodiment form according to FIG. 2 corresponds to the preceding embodiment form described above with reference to FIG. 1, and reference is had to the preceding comments.

Of course, changes can be made in various areas of the torque converter according to the invention without diverging from the principles of the present invention. For example, the intermediate friction element or intermediate friction elements could also be coupled directly with the piston 58 so as to be fixed with respect to rotation relative to it. Also, the carrier elements 77, 78 of the friction elements 66, 68 could be bent in their radial outer area toward the flywheel to enable a reduction in the axial extension of the driving element 80 away from the turbine wheel 32. The two carrier elements 77, 78 could also be bent toward one another in their radial outer areas so that the toothing arrangement of the driving element 80 can be reduced with respect to its axial extension. If it is necessary to provide a torsional vibration damper for reasons pertaining to vibrations or operation in various drive systems, this could be provided in the area radially inside the lockup clutch arrangement essentially axially between the clutch piston 58 and the turbine wheel shell 34, where there is sufficient space available.

What is claimed is:

1. A hydrodynamic clutch device comprising:

a housing;

a turbine wheel mounted for rotation about an axis of rotation in the housing, said turbine wheel having an outer diameter which approximately corresponds to a fluid flow outer diameter;

a lock-up clutch for selectively producing a torque transmitting connection between the turbine wheel and the housing, said lock-up clutch comprising at least one substantially annular friction element having a friction outer diameter and a friction inner diameter; and a pressing element which can act on said at least one friction element to produce said torque transmitting connection between the turbine wheel and the housing, said pressing element being connected to the housing for joint rotation about the axis of rotation, wherein the ratio of the flow outer diameter to the friction outer diameter is between 1.30 and 1.80.

2. A hydrodynamic clutch device as in claim 1 wherein the ratio of the flow outer diameter to the friction outer diameter is between 1.35 and 1.70.

3. A hydrodynamic clutch device as in claim 1 wherein the ratio of the friction outer diameter to the friction inner diameter is between 1.10 and 1.25.

4. A hydrodynamic clutch device as in claim 3 wherein the ratio of the friction outer diameter to the friction inner diameter is between 1.15 and 1.20.

5. A hydrodynamic clutch device as in claim 1 wherein said lock-up clutch and said turbine wheel each have an outer circumferential contour and the housing has a shape which conforms to the outer circumferential contour of the lock-up clutch and to the outer circumferential contour of the turbine wheel.

6. A hydrodynamic clutch device as in claim 5 wherein said housing comprises a first portion which is substantially cylindrical and surrounds the lock-up clutch, and a second portion which is curved and extends along the outer circumferential contour of the turbine wheel.

7. A hydrodynamic clutch device as in claim 1 further comprising a driving element which connects said at least one friction element to said turbine wheel so as to be essentially fixed against rotation relative to said turbine wheel.

8. A hydrodynamic clutch device as in claim 1 further comprising a driving arrangement which connects said driving element to said housing, said pressing arrangement being arranged axially between said pressing element and said turbine wheel.

9. A hydrodynamic clutch device as in claim 1 comprising a plurality of said friction elements, said device further comprising an intermediate element arranged axially between each two friction elements, said intermediate element being connected to said housing for joint rotation.

10. A hydrodynamic clutch device as in claim 1 further comprising a substantially annular first coupling element having a radial inner area connected to said housing and a radial outer area with means for connecting said coupling element to a drive shaft.

11. A hydrodynamic clutch device as in claim 1 wherein said housing comprises an interior space which is divided by said pressing element into a first space in which said turbine wheel is arranged and a second space, wherein working fluid can be exchanged between said first space and said second space.

12. A hydrodynamic clutch device as in claim 11 wherein said pressing element has a fluid through-opening for exchange of working fluid between the first work space and the second work space.

13. A hydrodynamic clutch device as in claim 11 wherein said friction element comprises a friction surface having an arcuate flow channel.

* * * * *